Dec. 26, 1939.  K. EHRLICH  2,185,056
CONE BEARING
Filed June 16, 1937   2 Sheets-Sheet 1

Inventor
Karl Ehrlich
By B. Singer, atty.

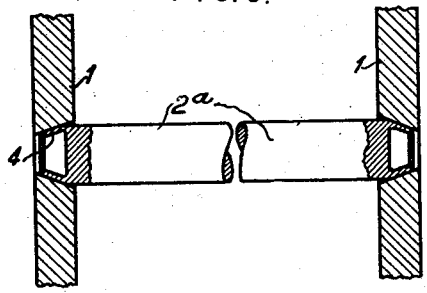
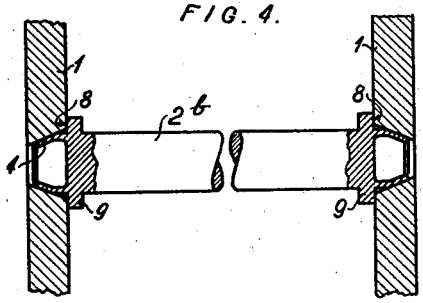
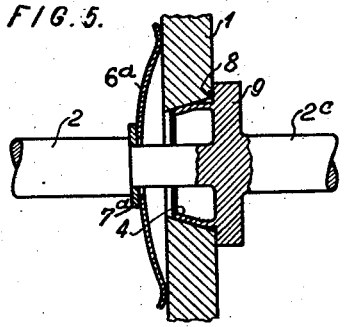
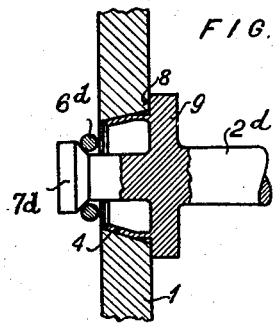
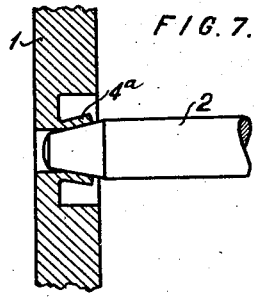

Patented Dec. 26, 1939

2,185,056

UNITED STATES PATENT OFFICE 2,185,056

CONE BEARING

Karl Ehrlich, Milan, Italy

Application June 16, 1937, Serial No. 148,572
In Austria June 30, 1936

10 Claims. (Cl. 308—22)

This invention relates to cone bearings, for instance for rotary condensers, and consists in the fact that the one part of the bearing is formed of a thin-walled deformable hollow-cylindrical extension which is caused to assume the required conical shape by being pressed against the conically pre-formed other part of the bearing, this other part of the bearing being made preferably from material of substantially the same or a higher degree of hardness.

For the supporting of shafts which are not to be permitted to have any axial or radial play it is usual to employ conical bearings, for example in the case of rotary condensers in which slight displacement of the rotary part brings about a considerable alteration in capacity. More particularly in cases in which it is only possible to support the shaft at one end bearings which fulfil this requirement are expensive and also, apart from necessitating costly precision work, are extravagant in the matter of space. The bearing according to the present invention, which is extremely simple to manufacture, is not inferior to a ground-in or adjustable cone bearing in the matter of precision and is at the same time extremely economical as regards the space required.

Forms of construction embodying the invention are shown, by way of example, in the accompanying drawings, in which:

Fig. 3 shows, in longitudinal section, a form of construction of the bearing according to the invention, in which the shaft is supported at both ends and subjected to slight strain in an axial direction.

Fig. 4 shows a form of construction of the bearing in which the shaft is supported at both ends and subjected to greater strain in an axial direction.

Fig. 5 shows a modification of the form of construction shown in Figs. 1 and 2.

Fig. 6 shows a form of the bearing for a one-sidedly supported or flying shaft.

Fig. 7 shows, in longitudinal section, a bearing in which the deformed hollow-cylindrical extension is provided on the stationary part of the bearing.

Figure 1:
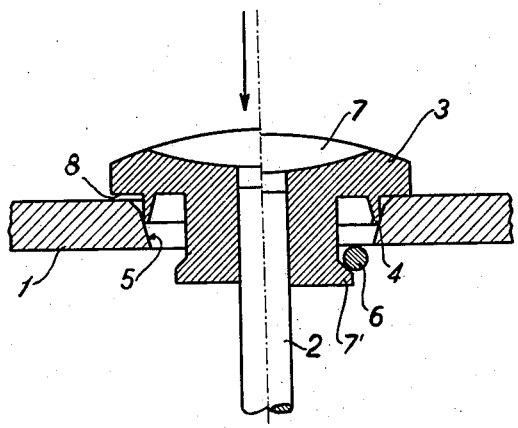
Fig. 1 is a section and Fig. 2 a plan view of a bearing according to the invention for the rotor shaft of a trimmer condenser.
Figure 2:
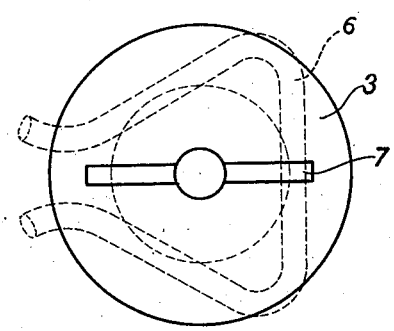

Referring to Figs. 1 and 2 of the drawings, the bearing for the shaft 2 of a trimmer condenser consists of a bearing body or block 1 having an aperture the wall of which forms the bearing cone or seating 5. The shaft 2 extends through this aperture and is provided at its outer end with a fixed head 3 having on its plane under side a thin-walled hollow-cylindrical extension 4. The material of this annular extension is preferably as hard as or softer than that of the bearing body 1. The top of the head 3 is provided with a cut 7 for the engagement of a screw-driver with which the adjusting of the bearing to the required capacity may be effected. First of all the head 3 with the shaft 2 is so inserted in the conical aperture in the second part of the bearing that these parts are assembled as shown in the left-hand half of Fig. 1. If pressure be then exerted upon the head 3 in the direction indicated by the arrow the cylindrical ring 4 assumes the fitting conical shape as a result of being pressed against the conical surface 5. The pressure required for this purpose is maintained until the portion of the under side of the head surrounding the ring 4 comes into contact with the part 20 1 of the bearing. The contacting plane surfaces 8 on the under side of the head and on the part 1 of the bearing not only serve as abutment (means of limiting the stroke) in assembling the bearing but also fulfill the purpose of taking up the axial bearing pressure, thereby relieving the strain on the conical surfaces themselves. Such bearing pressure, however, is always present, since the annulus 4 exerts a permanent resilient action which is opposed, when the shaft is supported at both ends, to the force exerted by the second annulus, and, when the shaft is supported at one end only, with the flying shaft arrangement in the form of construction shown in Figs. 1 and 2, to the action of the spring 6 taking the form of an embracing cotter. This spring 6, which in the form of construction shown in Figs. 1 and 2, is counter-supported on the one hand against a beading 7' and on the other hand against the part 1 of the bearing.

Fig. 3 illustrates the application of the invention to the supporting of a shaft 2ᵃ in two bearings. In this case, when the strain in an axial direction is slight, the stopping surfaces may be dispensed with (Fig. 3); at all events counter-supporting or thrust springs are superfluous, since one bearing cone holds the other in position.

Fig. 4 shows a modification of the structure illustrated in Fig. 3, wherein the shaft 2ᵇ has a disc 9 to engage the stop surface 8.

In Fig. 5 is shown a further modification in which the spring 6ᵃ is a leaf spring held in place by a suitable washer 7ᵃ on shaft 2ᶜ.

In Fig. 6 the embracing cotter pin 6ᵈ lies between the member 1 and the beading 7ᵈ. The springs 6ᵃ and 6ᵈ perform the same function as spring 6 in Figs. 1 and 2.

In the form shown in Fig. 7 the deformable element 4ᵃ is located on the stationary member 1.

The inner surfaces of the parts 1 of the bearings facing the shaft 2, 2ᵃ, 2ᵇ, as the case may be, may also serve as abutment surfaces, the counter abutting element on the movable part of the bearing being preferably in the form of a disc 9 (Figs. 4, 5, and 6) which may conveniently be formed integrally with the shaft.

The annular extension 4 to be deformed consists preferably of material which is softer than that of which the counter bearing is made. The material should be chosen with a view to satisfactory deformation and consequent easy and snug fitting of the bearing surfaces one against the other. Adequate deformability may also be obtained by other means than selection of the materials with regard to their relative hardness, for instance by making the annular extension sufficiently thin to enable the desired result to be brought about.

If necessary, the hollow-cylindrical ring to be deformed may also be provided on the fixed or stationary part of the bearing, as shown in Fig. 7, instead of on the shaft 2.

I claim:

1. In bearings, a stationary member and a rotary member each having cooperating conical bearing surfaces, the conical bearing surface of one of said members being located on a deformable portion thereof and integral therewith in virtue of which when said bearing members are pressed together in an axial direction the deformable portion will yield to adapt its bearing surface to that of the other bearing surface.

2. In bearings, a stationary member and a rotary member each having cooperating conical bearing surfaces, the conical bearing surface of one of said members being located on a deformable portion thereof and integral therewith in virtue of which when said bearing members are pressed together in an axial direction the deformable portion will yield to adapt its bearing surface to that of the other bearing surface, said deformable portion being composed of a material of a hardness no greater than that of said other bearing surface.

3. A cone bearing comprising a female member having a conical bearing surface and a male member having an integrally formed deformable cylindrical portion adapted to enter the female member and under axial pressure adapt itself to the conical surface of said female bearing member.

4. A cone bearing comprising a female member having a conical bearing surface and a male member having an integrally formed deformable cylindrical portion adapted to enter the female member and under axial pressure adapt itself to the conical surface of said female bearing member, said male member having a head, said head and said female member having opposed plane surfaces normal to the axis of the conical bearing surfaces.

5. A cone bearing comprising a female member having a relatively fixed conical bearing surface, and a male member having an integrally formed deformable tubular portion designed to enter the female member and under axial pressure be deformed into a conical bearing to conform to the conical bearing surface of the female member.

6. A cone bearing comprising a female member having an integrally formed deformable tubular portion and a male member having a non-deformable conical bearing portion to fit within said deformable tubular portion, whereby said deformable tubular member upon insertion of said non-deformable portion into the same with axial pressure will adapt itself to the form of the conical bearing portion.

7. A cone bearing comprising a stationary wall having a conical bearing aperture, a shaft passing through said aperture and having a disc with an integrally formed deformable ring projecting from one side and adapted to enter said aperture and upon application of axial pressure to force said ring into said aperture said ring will shape itself to fit said aperture as a conical bearing.

8. A cone bearing comprising a stationary wall having a conical bearing aperture, a shaft passing through said aperture and having a disc with an integrally formed deformable ring projecting from one side and adapted to enter said aperture and upon application of axial pressure to force said ring into said aperture said ring will shape itself to fit said aperture as a conical bearing, and resilient means acting to seat said ring in said aperture.

9. In bearings, a stationary member and a rotary member, each having cooperating conical bearing surfaces, the conical bearing surface of one of said members being located on a portion which is deformable only and is integral with the member, in virtue of which when said bearing members are pressed together in an axial direction the deformable portion will yield to adapt its bearing surface to that of the other bearing member's bearing surface.

10. In bearings, a stationary member and a rotary member, each having cooperating conical bearing surfaces, the conical bearing surface of one of said members being located on a portion which is deformable only and is integral with the member, in virtue of which when said bearing members are pressed together in an axial direction the deformable portion will yield to adapt its bearing surface to that of the other bearing member's bearing surface, the deformable portion being of a softer material than the remainder.

KARL EHRLICH.